April 18, 1961    C. H. TURPIN    2,980,540
DOUGH MIX PACKAGE
Filed Dec. 12, 1958
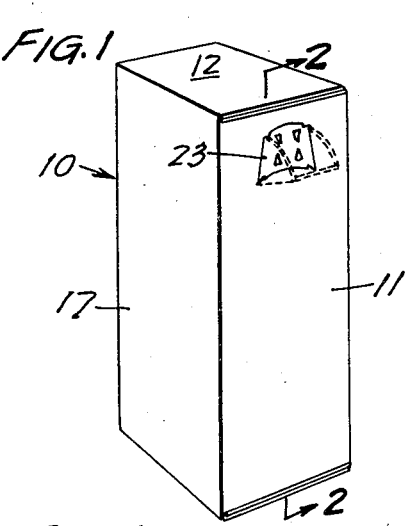
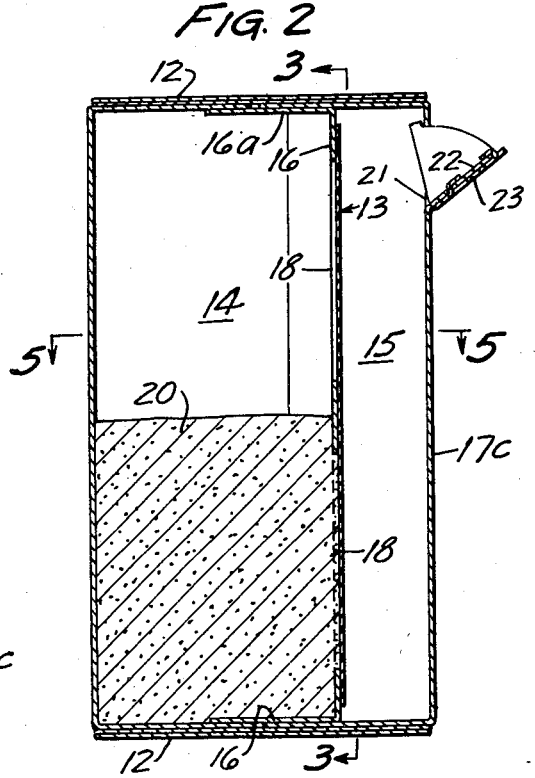
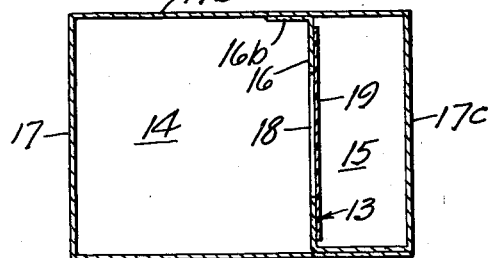
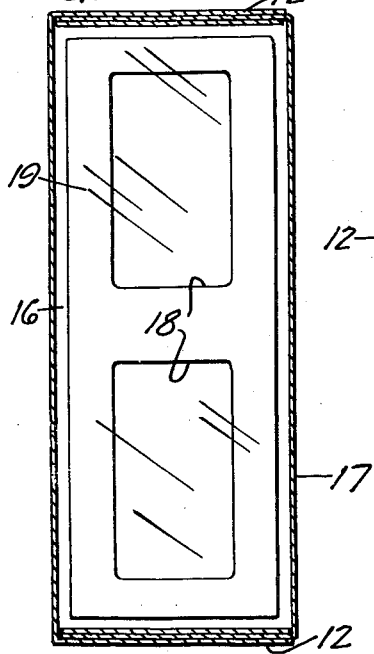
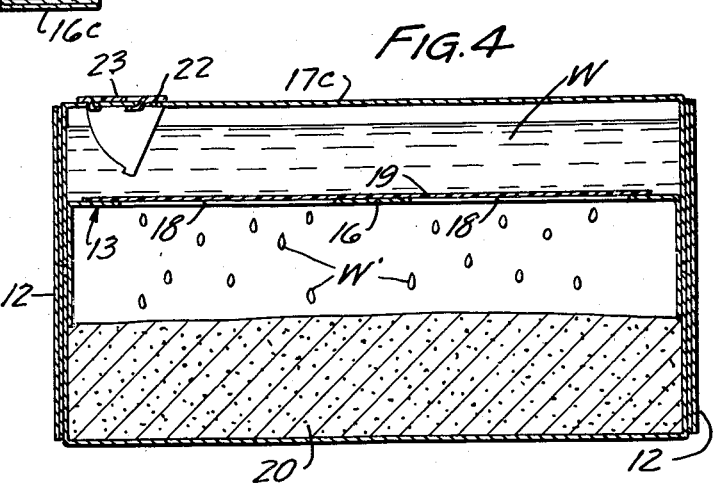
INVENTOR
CHARLES H. TURPIN
BY
Williamson, Schroeder & Palmatier
ATTORNEYS United States Patent Office 2,980,540
Patented Apr. 18, 1961

2,980,540
DOUGH MIX PACKAGE
Charles H. Turpin, Minneapolis, Minn., assignor to The Pillsbury Company, Minneapolis, Minn., a corporation of Delaware
Filed Dec. 12, 1958, Ser. No. 779,885
7 Claims. (Cl. 99—172)

This invention relates to a multiple-purpose container, which is well adapted for use with prepared, dry granular mixes of various materials, such as a flour-base food mix or the like, and for performing the multiple functions in connection with such a mix of storing the dry mix, providing for accurate measuring of liquid to be added to the mix, and then adding the liquid to the mix after the liquid has been properly measured.

An object of my invention is to provide a new and improved multi-purpose container of simple and inexpensive construction and operation to facilitate ready and easy performance of multiple functions in connection with a prepared mix such as a flour-base food mix or the like, of storing the mix, measuring the liquid to be added to the dry mix and adding the liquid to the mix to permit mixing by shaking of the dry mix with the liquid so as to produce a batter.

Another object of my invention is the provision of an improved prepared mix package wherein the liquid added may be measured and also wherein, after the liquid has been measured, it will be added to the dry prepared mix and may be mixed therewith by shaking of the package.

A further object of my invention is the provision of a prepared mix package storing a quantity of flour-base food mix or the like, and providing for the addition of a liquid or water in a predetermined quantity which is measured within the package and which liquid is maintained in separation from the dry mix by means of a water soluble panel until the water has been accurately measured, and then as the panel dissolves, the water or liquid is added to the dry prepared mix and may be mixed therewith by shaking of the package.

These and other objects and advantages of my invention will more fully appear from the following description made in connection with the accompanying drawings wherein like reference characters refer to the same or similar parts throughout the several views and in which:

Fig. 1 is a perspective view of the package;

Fig. 2 is a longitudinal section view through the package and taken on a plane as indicated substantially at 2—2 in Fig. 1;

Fig. 3 is a longitudinal section view of the package and taken on a plane as indicated at 3—3 in Fig. 2;

Fig. 4 is a longitudinal section view similar to Fig. 2 and showing the package after the liquid or water has been added and also showing the package in the position normally employed for shaking in order to mix the liquid with the dry mix for production of a batter; and Fig. 5 is a transverse section taken approximately at 5—5 in Fig. 2.

One form of the invention is shown in the drawings and is described herein. The prepared mix package is indicated in general by numeral 10 and includes a container 11 which, in the form shown, comprises a multi-sided box constructed of water-resisting cardboard material. The box has substantially conventional inwardly folded and adhesively secured flaps 12 at the upper and lower ends thereof and defining the top and bottom portions of the wall structure.

The container 11 is provided with divider means, indicated in general by numeral 13, extending across the interior of the box in sealed relation thereto to divide the box interior into a pair of compartments 14 and 15. More specifically, the divider means 13 includes, in the form shown, a divider wall 16 which extends endwise of the box into sealed relation with the upper and lower flap structures 12, and also extends transversely across the box into sealed relation with the side walls 17a and 17b. The divider wall 16 has upper and lower flaps 16a which are adhesively secured to the top and bottom flap structure 12 of the box so as to assure a sealed relationship. The divider wall 16 also has a side flap portion 16b which is also adhesively secured to the corresponding sidewall portion 17b of the box. It will be noted that the entire box construction, including the general sidewall structure 17 thereof and the divider wall 16 and the flap portions 12 are all formed integrally with each other in a one-piece construction from a single unitary blank of the water-resisting cardboard material. The panel portion 16c is adhesively secured to the box sidewall portion 17a to provide a sealed relationship between the compartments 14 and 15 and to hold the box sidewall structure 17 together.

The divider wall 16 has a pair of large openings 18 therein, which are normally closed by an overlying panel 19 of transparent methyl cellulose sheet material which is of such a nature as to be adapted to dissolve in water. The panel 19 is adhesively secured around its edges to the divider wall 16 so as to obstruct the openings 18 and prevent immediate flow communication through the openings and between the compartments 14 and 15. An important aspect of the present invention is the use of the water-soluble panel 19 so as to temporarily obstruct flow-communication between the compartments when water is applied into the compartment 15 so as to permit accurate measuring of the water in that compartment and then after the water has been measured, the panel 19 will dissolve so as to permit flow-communication between the compartments through the openings 18 which are of substantial size as will hereinafter be more fully described.

The compartment 14 contains a quantity of dry and generally granular or pulverant flour-base food mix 20 and it will be particularly noted that the compartment 14 is only partially filled with the mix so as to allow an empty space of substantial size which is utilized subsequently during the addition of the water or liquid to the dry mix during shaking of these materials for mixing of them.

The box sidewall portion 17c has an opening 21 formed therein defined by the cut-out flap 22 to which the spout construction 23, of substantially conventional design, is secured so as to provide for reclosing of the opening 21.

In the use of the package 10, the prepared mix will be stored in the compartment 14 as the product is sold and the consumer will first swing the spout construction 23 and flap 22 outwardly to expose the opening 21, and then water will be poured through the opening 21 into the compartment 15 (with the box in upright position) so that the water level comes up to the lower edge of the opening 21 or the hinging portion of the flap 22. During the adding and measuring of the water, which is shown in Fig. 4 and indicated by the letter W, the panel 19 will temporarily obstruct flow communication between the compartments so that accurate measuring of the water may be accomplished. Within a few seconds, the panel 19 will start to dissolve and water is gradually added to the dry flour-base food mix 20. At first the water merely seeps through the panel 19 and may be added in droplets W'. Subsequently, the entire panel 19, at least in the openings 18 will be dissolved and with the water, will be mixed with the mix 20. It has been found that in the quantities of the methyl cellulose employed in the panel 19, when dissolved in the water and mixed with the mix 20, has no deleterious or damaging effect on the food mix, but actually improves the food product resulting. As the panel 19 dissolves, the entire interior of the box, including the compartments 14 and 15 acts as a single large chamber because of the large size of the openings 18, and adequate space is thereby provided for shaking the package in order to thoroughly mix the water with all portions of the dry mix 20 and thereby form a batter of the desired consistency. It will be seen that ordinarily the package is maintained in the horizontal position shown in Fig. 4 during the shaking operation, whereas, when the water is being added, the container is oriented in an upright position, as shown in Fig. 2.

It should be understood that although the primary usage contemplated for the package 10 is in connection with flour-base food mixes such as layer cakes, hot rolls, and pancakes, the package could as well be used with other types of dry material to which liquid or water must be added in order to put the materials into usable condition. Examples of other types of materials are coloring dyes and household plant fertilizers.

It will be seen that I have provided a new and improved multi-compartmented container wherein the compartments are separated by means of a water-soluble panel so that the water may be added to and measured in one of the compartments and subsequently added, by dissolving the panels, to the dry materials in the other compartment so that the batter may be completely formed in the container in which the product is sold without necessitating the use of additional mixing utensils and dishes.

It will, of course, be understood that various changes may be made in the form, detail, arrangement and proportion of the parts without departing from the scope of my invention which consists of the matter described herein and set forth in the appended claims.

What I claim is:

1. A container for storing a dry particulate material and for use in preparing a water mixture therefrom, said container comprising a substantially water-tight box constructed of moisture-resisting material, and divider means extending across the interior of the box in sealed relation thereto to define a first storage compartment and a second measuring compartment in the box interior, said box having means providing access into said second compartment to facilitate adding of water thereto, said divider means including a water-soluble portion to permit, when dissolved, flow communication between the compartments, whereby the particulate material may partly fill said first compartment and water may be added to and measured in the second compartment and the water and particulate material may be mixed together by shaking when said water-soluble portion dissolves.

2. A dual purpose, prepared mix package for use with water, said package comprising a substantially water-tight box constructed of moisture-resisting material, divider means extending across the interior of the box in sealed relation thereto to define a first storage compartment and a second measuring compartment in the box interior, said divider means including a water-soluble portion to permit, when dissolved, flow communication between the compartments, said box having means providing access into said second compartment to facilitate adding of water thereto, a quantity of primarily dry and particulate material, said quantity of material being disposed in said first compartment, and said second compartment being empty and having a predetermined volume in which to measure the water to be added to said quantity of particulate material for producing a water mixture of predetermined consistency.

3. A container for storing a dry material and for use in preparing a water mixture therefrom, said container comprising a substantially water-tight box constructed of moisture-resisting material, divider means extending across the interior of the box in sealed relation thereto to define a first storage compartment and a second measuring compartment in the box, said divider means including a water soluble portion to permit, when dissolved, flow communication between the compartments, the box sidewall having an opening therein providing access to the second compartment to facilitate adding of water thereto, and means for reclosing said opening, whereby the particulate material may partly fill said first compartment and water may be added to and measured in the second compartment and the water and mixture may be mixed together by shaking when said water-soluble portion dissolves.

4. A prepared mix package for use with water, said package comprising a substantially water-tight box constructed of moisture-resisting material, divider means extending across the interior of the box in sealed relation thereto to define a first storage compartment and a second measuring compartment in the box interior, said divider means including a water-soluble portion to permit, when dissolved, flow communication between the compartments, a quantity of flour-base food mix disposed in one of said compartments and partially filling the same, the other of said compartments being empty and having a predetermined volume in which to measure the water to be added to said quantity of particulate material for producing a water mixture of predetermined consistency, said box having means facilitating insertion of water into said second compartment, and said water-soluble portion of the divider means being constructed of a material of the type which is safely edible and which has a non-deleterious effect on the food mix when the portion is dissolved, whereby the package will store the mix, measure the water to be added to the mix and will add the water to the mix and permit mixing thereof by shaking the package.

5. A container for storing a mixture of dry particulate material and for use in preparing a water mixture therefrom, said container comprising a substantially water-tight box constructed of moisture-resisting material, divider means extending across the interior of the box in sealed relation thereto to divide the interior into a first storage compartment and a second measuring compartment for respectively storing a quantity of the particulate material and measuring a quantity of water to be added to the particulate material, said box having means providing access into said second compartment to facilitate adding of water thereto, and said divider means including a water-soluble panel permitting, when dissolved, flow communication between the compartments, whereby to permit adding of the water measured in the second compartment to the particulate material stored in the first compartment and to permit producing a batter by shaking the container.

6. A prepared mix package for use with water, comprising a quantity of flour-base food mix, a substantially water-tight box constructed of moisture-resisting material, divider means extending across the interior of the box and sealed relation thereto to divide the interior into a first storage compartment and a second measuring compartment, the flour-base food mix partially filling the first compartment, and the second compartment being empty and having a predetermined volume to permit accurate measuring of a predetermined quantity of water to be added to the food mix, said divider means including a water-soluble panel constructed of material which is safely edible and non-toxic when dissolved in water, the box sidewall having a reclosable opening in communication with said first empty compartment to permit adding of water thereto, whereby the water added into said first compartment will be measured and will cause dissolving of the panel so that the liquid and food mix will be added to one another and may be mixed together into a batter by shaking the package.

7. A prepared mix package for use with water, comprising a substantially water-tight box constructed of moisture-resisting material, a quantity of dry and particulate flour-base food mix, divider means extending across the interior of the box in sealed relation thereto to divide the interior into a first storage compartment and a second measuring compartment, the food mix partially filling the first compartment, the second compartment being empty and having a predetermined volume for accurate measuring of the quantity of water to be added to the food mix in preparing a batter of predetermined consistency, said divider means including a water-soluble panel constructed of methyl cellulose and separating the compartments from each other and permitting, when dissolved, flow communication between the compartments, and the box having an opening in the sidewall thereof providing access to said first empty compartment for adding of water thereto, and means on the box for reclosing said opening, whereby to permit ready and easy production of a batter.

References Cited in the file of this patent

UNITED STATES PATENTS

| | | |
|---|---|---|
| 1,324,662 | Goldsworty | Dec. 9, 1919 |
| 1,592,395 | Sulzberger | July 13, 1926 |
| 2,177,919 | Vogt | Oct. 31, 1939 |
| 2,697,531 | Hood | Dec. 21, 1954 |
| 2,828,858 | Tooke | Apr. 1, 1958 |